Oct. 24, 1944.  W. F. HEROLD  2,361,290
INDUSTRIAL TRUCK
Filed Oct. 5, 1942  2 Sheets-Sheet 1

Inventor
Walter F. Herold
By Rockwell & Bartholow
Attorneys

Oct. 24, 1944. W. F. HEROLD 2,361,290
INDUSTRIAL TRUCK
Filed Oct. 5, 1942 2 Sheets-Sheet 2

Inventor
Walter F. Herold,
By Rockwell & Bartholow
Attorneys

Patented Oct. 24, 1944

2,361,290

UNITED STATES PATENT OFFICE 2,361,290

INDUSTRIAL TRUCK

Walter F. Herold, Easton, Conn., assignor to The Bassick Company, Bridgeport, Conn., a corporation of Connecticut Application October 5, 1942, Serial No. 460,813

18 Claims. (Cl. 188—41)

In industrial trucks used in factories and similar places for carrying loads of various kinds from one place to another, and in rolling platforms or scaffolds used in assembling and working upon airplanes and other structures, it is frequently desirable to have means for anchoring and stabilizing the movable body so that it will be effectively held against displacement relative to its underlying supporting surface. Devices have been provided for this purpose having foot-like members movable downwardly to engage the floor with a frictional contact. However, prior devices have been open to a number of objections which have prevented their giving satisfaction in use, or have at any rate restricted their utility to a substantial extent. Among such objections was the fact that the foot-like member was customarily located where it was likely to strike projections such as door sills and the like as the truck moved over the floor. Also, hand-operated means for adjusting the height of the foot members was supplied, and this was so arranged and located as to interfere with access to the upper or load-carrying part of the truck.

One of the objects of my invention is to overcome the drawbacks and disadvantages of previous devices of this general nature.

Another object is to provide an anchoring device usable with a truck or platform running on rails. There are distinct advantages in mounting assembling platforms, for example, on rails, for their movement is more effectively and precisely guided and controlled, and it is very desirable that the guided platforms, trucks or like vehicles be provided with effective means, conveniently operable, for holding them in a position in which they have been set.

Another purpose of the invention is to furnish an anchoring device which will effectively anchor the vehicle, whether the same is track mounted or rolls on a planar surface.

Another object is to provide an anchoring device applicable to a vehicle having wheels adapted to run along upstanding track rails or directly on a floor, and which, without adjustment or change in the construction of the anchoring device, can be used for anchoring and holding the vehicle when shifted from a track to a floor or vice versa.

To these and other ends the invention consists in the novel features and combinations of parts to be hereinafter described and finally pointed out in the claims.

Figure 1:
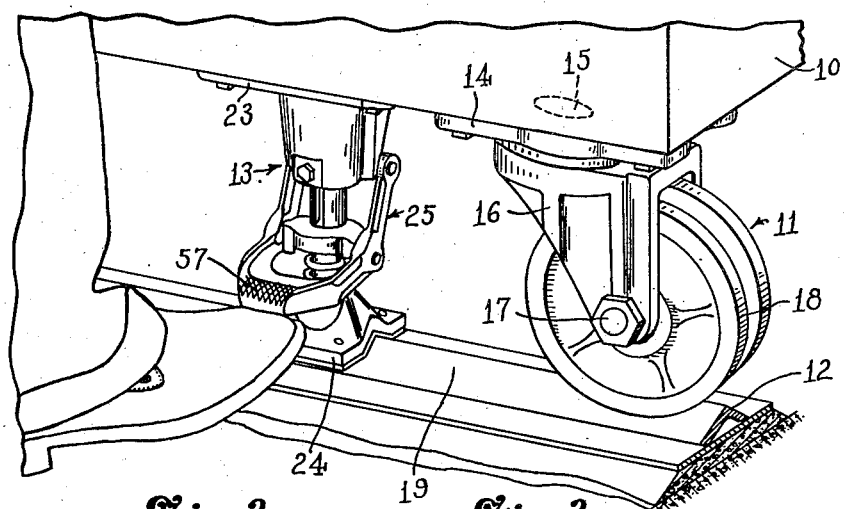
Fig. 1 is a perspective view showing a portion of a rail-mounted truck provided with an anchoring device embodying my improvements, said device being engaged with its associated rail for anchoring the vehicle.

In Fig. 1 there is illustrated a portion of a truck body 10 equipped adjacent one corner with a supporting wheel or caster structure 11 guided along a track rail 12. Mounted in what will be following relation to the caster structure 11 when the truck is moved toward the right (Fig. 1), is an anchoring device 13 supported from the truck body at the underneath portion of the latter and adapted in the anchoring or engaged position to be engaged with the track rail 12 in the manner hereinafter described. In the device illustrated the caster structure 11 is of the swiveling type, but my improvements are not limited to use with swivel casters. In the particular form shown an attaching plate 14 is attached to the truck at the underneath portion, and to this plate is swiveled by means of a pin 15 a horn 16, in which is mounted an axle 17 and a wheel 18.

Figure 7:
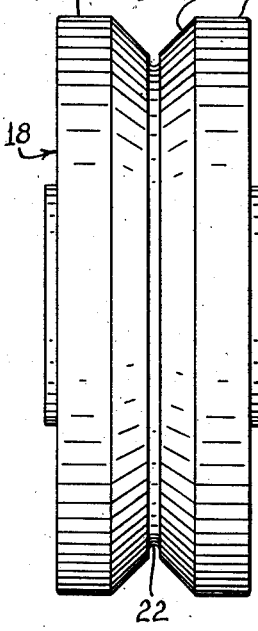
Fig. 7 is a detail elevational view of one of the truck wheels.

The wheel 18 should be capable of guided movement along a suitable track rail, or for free rolling movement on the ordinary floor, and with this in view the wheel face preferably but not necessarily has a form such as shown particularly in Fig. 7, the face being fairly wide and being provided with an intermediate or median rail-engaging groove, and at opposite sides of this groove with suitable surfaces adapting the wheel for rolling engagement with an ordinary floor. Preferably the upstanding rail 19 of the guiding track is of inverted V shape in cross section, thereby providing a rail having smooth upwardly converging side faces. To engage this rail the wheel 18 has a central V-shaped groove 20. At opposite sides of this groove the wheel face has the smooth cylindrical surfaces 21 adapting it for rolling support on an ordinary floor. Preferably a small clearance groove 22 is provided at the bottom of the groove 20.

The anchoring device 13 in the engaged position is adapted to engage the rail 19 for holding the vehicle in place. It is attached to the under portion of the vehicle body in a stationary manner, and has a foot member or shoe movable into and out of the anchoring position by a lever mechanism adapted to be operated by the foot of the operator. The stationary upper part of the device, which is attached to the vehicle, is indicated in Fig. 1 at 23, the foot or shoe at 24, and the lever mechanism at 25. The foot or shoe 24 is of a character adapting the device for pressure either against the guide rail 19 or against an ordinary floor on which the vehicle may travel, and for this purpose the preferred practice is to provide the shoe with a median groove adapted to engage the rail, and with horizontal surfaces at opposite sides of the grooves adapted to engage a floor. The rail-engaging groove is parallel to the longitudinal axis of the vehicle, and preferably there is provision for maintaining this relationship so that the shoe cannot be shifted out of the proper rail-engaging position. It is preferred also to have the shoe generally rectangular in plan, although this is not necessary in all cases.

Referring now to the details of the structure shown, it will be seen that the shoe 24 has at the upper part an attaching sleeve or socket portion 25ª formed integrally with a lower portion 26 of web-like character rectangular in plan. The guide groove in the foot which adapts it for use in connection with the track rail, is formed by a median longitudinal groove 27 of inverted V shape. At opposite sides of the grooves 27 the lower surface of the member 25ª, 26 (which is preferably constructed of metal) is substantially horizontal and flat, as indicated at 28. Preferably a suitable friction facing is applied to the under part of the metal foot, and in the form shown a layer 29 of leather or the like is applied to the foot over its entire under surface, the facing being conformed to the groove in the metal member so as to provide a lined V-shaped groove 30 adapted to engage and conform to the summit portion of the rail. The facing 29 may be applied to its support by suitable means, for example, by rivets 31 arranged at suitable points along the side portions of the support.

The socket portion 25ª, mentioned above, is attached to and carried by the lower end of a vertically movable rod or plunger 32 which is guided in the stationary part 23. The lower end of the rod 32 is somewhat reduced and extended into a socket 25ᵇ in portion 25ª, and secured in said socket in a suitable manner, as by means of a cotter pin 33. The upper surface of the portion 25ª provides a shoulder against which presses a helical spring 34 surrounding the rod 32. This spring 34 is adapted to be compressed against portion 25ª by means of a collar 35 having at its lower surface a depression 36 in which the upper end of spring 34 is engaged. The collar 35 is operable by the lever mechanism 25 in the manner hereinafter described. This collar 35 is arranged to slide up and down on a cylindrical portion 37 of rod 32, which portion 37 extends upwardly to a shoulder 38 on the rod or plunger 32. Above the portion 37 the rod is provided with a larger-diametered cylindrical portion 39 which engages an opening 40 in the stationary part 23. The upper part of the rod extends into a cylindrical socket 41 in a housing portion 42 of part 23, housing portion 42 having an integral attaching flange 43 at its upper end which is adapted to be fastened to the under surface of the vehicle body by means such as bolts 44. The upper end of the rod 32 is provided with a laterally extending integral collar 45, and a helical spring 46 is arranged around the rod between the collar 45 and the bottom of the socket 41. The spring 46 is an expansion spring, and its tendency is to hold the rod or plunger in the raised position shown in Fig. 5.

The lever mechanism 25 for operating the foot member is in the nature of a toggle device adapted to be operated by a person's foot, and in the form shown it comprises an upper lever pivoted to and depending from the stationary part 23, and a second lever pivoted to the lower end of the first and provided with a pedal extension readily accessible at the side of the truck. The upper lever of the toggle is shown at 47, the lower lever at 48, and the pedal extension of lever 48 at 49. Lever 47 is of generally H shape, and at its upper end is pivoted by means of a pin 50 to a lug 51 located rearwardly of housing 42. Lever 48, with its pedal extension 49, is generally of U shape, the pedal extension being at the connecting part of the U. The open end of the U part is pivoted by means of a pin 52 to the lower end of lever 47. The pedal extension 49 is preferably offset from the plane of lever 48 at a slight angle, as shown. At the junction of lever 48 with the pedal extension 49, connection of the lever system is made to the rod or plunger and its attached parts.

Figure 3:
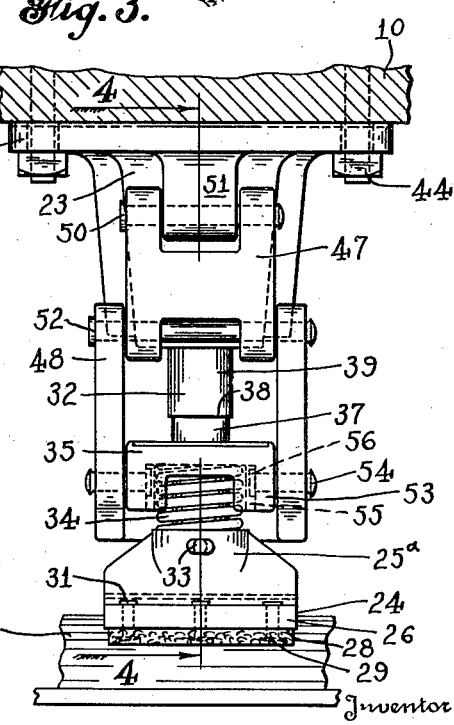
Fig. 3 is an elevational view showing the back or rear part of the anchoring device.

The collar member 35, previously mentioned, is disposed within the open part of the lever member 47, 48, and is provided at the sides with depending lugs 53. These lugs 53 provide means for connecting the collar to the lever mechanism, for each lug 53 is provided with a lateral hole receiving a pin 54 extending through a side member of lever member 48, 49, and providing a pivot member connected to the collar. In the case shown, each of the lugs 53 is provided at its inner face with a recess 55 (Fig. 3) receiving a head 56 at the inner end of the corresponding pin 54. The outer end of the pivot pin 54 may be upset, as indicated in the drawings, for completing a pivotal connection between the lower toggle lever and the collar.

The upper surface of the pedal extension 49 adjacent the free extremity of the extension is suitably roughened in the manner shown at 57 in Fig. 1, so that a person's foot can be engaged therewith without slipping, in the operation of forcing the brake shoe to the engaged position.

Figure 5:
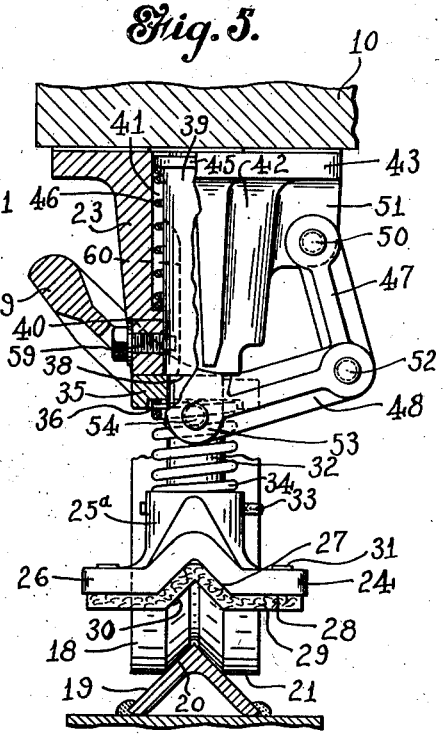
Fig. 5 is a view generally similar to Fig. 2 but with additional parts shown in section, showing the anchoring device in the released or disengaged position.

It will be seen that in the "off" or disengaged position of the anchoring device, as shown in Fig. 5, the lower surface of the shoe will be spaced upwardly from the rail at a certain definite distance. The spring 46 in the upper socket, acting on the plunger, urges it in an upward direction, and upward movement of the plunger is arrested by the upper surface of the collar 35 coming against the lower surface of the housing, as shown in Fig. 5. The spring 46 is in the normal or expanded condition.

Figure 2:
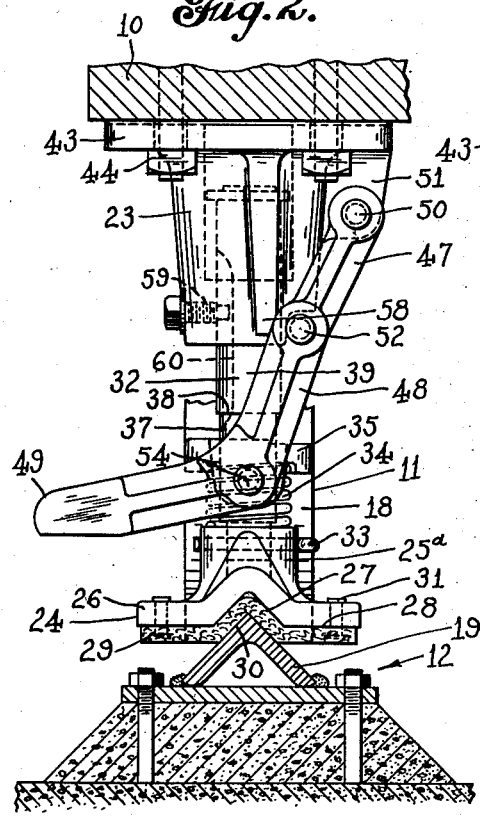
Fig. 2 is a transverse vertical section showing the anchoring device in the operative position.

In order to move the shoe to the engaged position, the operator's foot is pressed down on the free extremity of the pedal extension, which is readily accessible at the side of the truck, and the lever mechanism is thereby operated to carry the shoe to the rail-engaging position. As the lever mechanism is moved, the first effect is to move collar 35 downward by means of the pins 54 carried by the lower toggle lever. This causes the lower spring 34 to be moved downwardly ahead of collar 35, and spring 34 being engaged with the upper part of foot member or shoe 24, moves the foot member or shoe downwardly. At a later stage of this movement the lower surface of the shoe engages the rail. Upon further downward movement of the pedal extension the spring 34 is compressed, the shoe being restrained against further downward movement and the collar member 35 moving down away from shoulder 38. Finally, as the spring 34 is further compressed, the toggle members 47, 48 become aligned with each other and snap beyond the center line to lock the toggle in the position shown in Fig. 2, for example. In this position the toggle is stopped by coming into contact with stop members 58 provided on the sides of the housing and having lower end portions adapted to be contacted by the upper end portions of toggle member 48. At this stage the shoe is held against the rail with a certain definite pressure corresponding to the strength of spring 34 and the compression thereof which has taken place. By this means a very satisfactory anchoring engagement and pressure between the shoe and the rail can be provided, the spring 34 being of proper strength and being compressed to a proper degree for the purpose in view.

In order to release the anchoring device, it is simply necessary to introduce the toe beneath the pedal extension in the manner indicated in Fig. 1, after which the pedal extension can be readily lifted to move the toggle lever to the release point. As soon as the release point is reached the lower spring is expanded to raise the collar, and the upper spring is expanded to raise the plunger from the upper end. When the release point is reached the moving parts are carried by a practically instantaneous action into the position shown in Fig. 5.

It will be understood that when the anchoring device is placed in the operative position, the foot member will be thrust against the rail with sufficient force to transfer a considerable part of the load at that side of the truck from the supporting wheels or casters to the anchoring device, whereby the truck is firmly anchored and stabilized. Usually the downward movement of the shoe is of such extent that the adjacent wheel or wheels remain in light contact with the rail, thereby assisting in preventing any sidewise shifting of the vehicle.

In order to prevent the rod or plunger 32 from turning in its guide (which would turn or twist the shoe relatively to the rail), I prefer to provide means associated with the housing whereby the movement of the plunger in the housing is restricted to a linear movement. For this purpose I may provide on the housing portion a member such as a secrew 59 having threads engaging a tapped hole in the housing wall and provided with a protruding inner end engaging a longitudinal guide groove 60 with which the plunger is provided.

Figure 6:
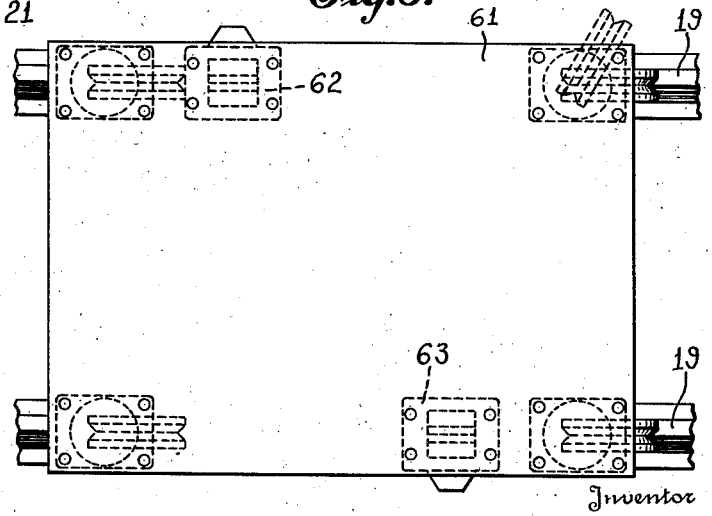
Fig. 6 is a top plan view, somewhat diagrammatic in character, illustrating a track-mounted truck provided with two anchoring devices.

In Fig. 6 I have shown one of the ways in which anchoring devices of the kind described may be used on a track-guided industrial truck. The arrangement shown in this view involves the use of two anchoring devices in connection with a truck body 61 supported on casters of a kind previously mentioned, arranged adjacent the respective corners of the truck body and rolling on a track comprising rails 19. These casters are shown as being of the swivel type. The two anchoring devices are indicated at 62 and 63, the device 62 being located in proximity to one of the corner casters at one side of the truck, and the device 63 having a similar arrangement with respect to the diagonally disposed corner caster. It will be observed that the anchoring devices do not project substantially laterally beyond the lines of the truck, and that they do not in any way interfere with the load carried by the truck body. There is no difficulty arising from the dragging of the shoes on or along the adjacent rail, because for practical purposes each shoe has only two positions, one of which is the "off" position, in which there is a definite and sufficient spacing from the rail for clearance purposes, and the other of which is the "on" position, in which the shoe has a considerable friction area in engagement with the rail and is strongly pressed against the rail.

There are definite advantages in using rail-mounted trucks on assembly lines in certain kinds of manufacturing operations. One of these advantages is that, by supporting the rails from the ground or floor by means of an interposed layer of grouting, as suggested in Fig. 2, a track can be built which is level, thus giving a better and more precise control of the vehicle movement. However, an effective anchoring action is very desirable under these conditions for holding the vehicle firmly in the position to which it has been moved, and the anchoring device herein described fulfills this requirement, and is besides very easy to install and convenient to operate.

Figure 4:
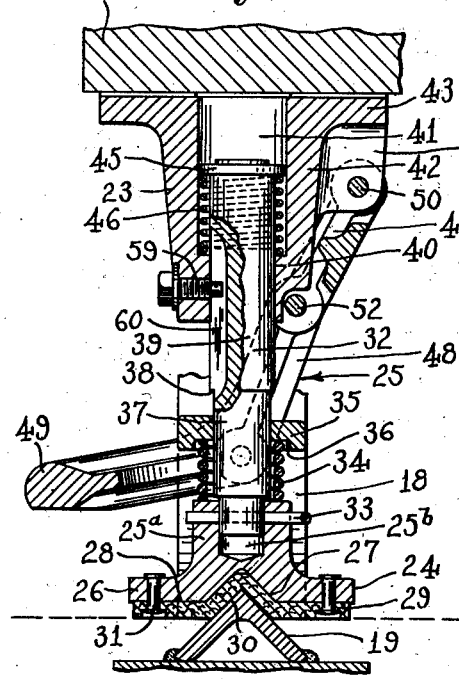
Fig. 4 is a section on line 4—4 of Fig. 3.

Another advantage of the improved construction arises from the fact that the anchoring device is so constructed that it will operate when the vehicle is mounted on the track or has engagement with a planar support such as an ordinary floor. In the latter case the vehicle is supported on the floor by means of the wheel surfaces 21. For anchoring, the shoe is moved downwardly by the same operation previously described, and the shoe surfaces at opposite sides of the groove in the shoe are pressed against the floor so as to have an effective anchoring action. The relation of the floor to the anchoring device in such case is as indicated by the horizontal dotted line in Fig. 4. The shoe contacts the floor at substantially the same distance from the truck body as in making contact with the rail. No change or adjustment of the anchoring device is required when the vehicle is shifted from use on a track to use on a floor or vice versa. When the vehicle is rolling on the floor, the cylindrical surfaces 21 on the wheels provide ample supporting surfaces for the vehicle and prevent the floor from being scarred or otherwise injured.

The arrangement of the anchoring devices relatively to the vehicle, as shown in Fig. 6, is of particular advantage when the vehicle is supported on the ordinary floor or like planar surface. In such case casters such as those shown have a free swiveling movement, and it is of advantage to place one of the anchoring devices fairly close to a corner caster, in respect to which caster the anchoring device may have a following relation when the vehicle is moved in one direction. This is suggested at the upper left-hand corner of Fig. 6, and it is preferred to have a substantially identical arrangement of caster and anchoring device at the diagonally opposite corner of the vehicle.

While I have described in detail one form of the invention, it is to be understood that this is by way of example only, and that various modifications and changes in the organization of parts and in the constructional details may be made without departing from the principles of the invention or the scope of the claims.

What I claim is:

1. An industrial truck adapted to run on rails or to roll freely on a planar surface having a truck-body-supported anchoring device adapted to anchor the truck by pressure against either the planar surface or one of the rails, said anchoring device having a shoe with a friction surface shaped to engage the planar surface and another friction surface shaped to conform to the rail.

2. An industrial truck carrying underneath its body foot-operable lever mechanism at the side of the truck, and an anchoring shoe carried by said lever mechanism having a friction surface shaped to conform to a rail and another friction surface shaped to engage a planar surface over which the truck rolls.

3. An industrial truck carrying underneath its body portion a depressible anchoring and stabilizing shoe with means for exerting pressure thereon, said shoe having a rail-engaging groove and adjacent said groove a friction surface to engage a floor, said shoe being movable the same distance to anchor the truck whether the latter rolls on a track or on the floor.

4. An industrial truck adapted to run on rails or to roll on a planar floor carrying underneath its body portion a depressible anchoring shoe with means for exerting pressure thereon, said shoe having intermediate of its width a V-shaped rail-engaging groove and at opposite sides of the groove respectively substantially horizontal floor-engaging friction surfaces of considerable area.

5. A rolling platform for use in assembly operations in industrial plants and mounted for precise rectilinear guidance and for precise positioning when brought to rest, said platform having a supporting wheel with a groove conformed to the summit portion of a guide rail of inverted V-shaped cross-section, and said platform also having at the underneath portion an anchoring device comprising a foot rectilinearly guided up and down and having a V-shaped groove engageable with the summit of the guide rail, said anchoring device also comprising operating mechanism whereby said foot is pressed against the rail to an extent such that the platform is slightly lifted without disengaging the wheel from the rail, said operating mechanism including a toggle having an upper pivotal mounting in fixed relation to the platform.

6. A rolling platform for use in assembly operations in industrial plants and mounted for precise rectilinear guidance and for precise positioning when brought to rest, said platform having a supporting wheel with a groove conformed to the summit portion of a guide rail of inverted V-shaped cross-section, and said platform also having at the underneath portion an anchoring device comprising a foot rectilinearly guided up and down and having a V-shaped groove engageable with the summit of the guide rail, said anchoring device also comprising operating mechanism whereby said foot is pressed against the rail to an extent such that the platform is slightly lifted without disengaging the wheel from the rail, said operating mechanism including a toggle having an upper pivotal mounting in fixed relation to the platform, said wheel having at opposite sides of its groove surfaces adapted to roll on a floor without scarring it, and said shoe being provided at opposite sides of its groove with surfaces of considerable area engageable with the floor.

7. An industrial truck carrying underneath its body a rectilinearly guided depressible anchoring shoe provided with a V-shaped groove and at opposite sides of the groove respectively substantially horizontal floor-engaging friction surface of considerable area, and toggle mechanism for raising and lowering the shoe having a fixed pivotal relation at its upper end with the body of the truck.

8. An industrial truck carrying underneath its body a rectilinearly guided depressible anchoring shoe provided with a V-shaped groove and at opposite sides of the groove respectively substantially horizontal floor-engaging friction surfaces of considerable area, and toggle mechanism for raising and lowering the shoe having a fixed pivotal relation at its upper end with the body of the truck, said toggle mechanism being adapted to shift said shoe between an elevated position and a lowered position, the shoe when shifted downwardly to a predetermined extent engaging a floor or a guide rail.

9. An industrial truck carrying a depressible anchoring and stabilizing shoe, said shoe having a rail-engaging groove and adjacent said groove a friction surface adapted to engage a floor, and operating mechanism for said shoe whereby it is movable between a predetermined elevated position and a predetermined depressed position, the shoe when depressed to a predetermined extent being engaged with the rail or the floor as the case may be.

10. An industrial truck having a supporting wheel provided with a substantially cylindrical supporting surface of considerable area and with an intermediate V-shaped groove, said truck also carrying underneath its body a depressible anchoring shoe having on its lower surface an intermediate V-shaped groove aligned with the groove of the wheel and at opposite sides of said groove friction surfaces of considerable area to engage a floor, and operating mechanism for said shoe whereby it is shifted between a predetermined elevated position and a predetermined depressed position and subjected to spring pressure in the depressed position.

11. An industrial truck having a rolling support comprising a wheel with a substantially cylindrical surface of considerable area to engage a floor without scarring the same, said wheel also being provided with a groove whereby it is engageable with a guide rail, said truck carrying underneath its body portion a depressible anchoring shoe having over-center toggle mechanism whereby the truck is lifted to a predetermined extent, said shoe being engageable with the rail if the truck is rail supported and with the floor if the truck is floor supported.

12. An industrial truck having a rolling support comprising a wheel with a substantially cylindrical surface of considerable area to engage a floor without scarring the same, said wheel also being provided with a groove whereby it is engageable with a guide rail, said truck carrying underneath its body portion a depressible anchoring shoe having over-center toggle mechanism whereby the truck is lifted to a predetermined extent, said shoe being engageable with the rail if the truck is rail supported and with the floor if the truck is floor supported, the shoe when depressed to a predetermined extent contacting the rail or the floor as the case may be.

13. An anchoring device such as described, comprising a movable member having a substantially vertical stem carrying at its lower end a foot member engageable with a supporting surface, means for guiding said movable member for substantially vertical rectilinear movement, and means operable from the side of the vehicle by the foot of the operator for moving said foot member between a predetermined elevated position and a predetermined depressed position, said foot member having a groove providing a surface to engage a rail and also having floor-engaging surfaces at opposite sides of said groove.

14. An anchoring device such as described comprising a movable member having a substantially vertical stem carrying at its lower end a foot member engageable with a supporting surface, means for guiding said movable member for substantially vertical rectilinear movement, and means operable from the side of the vehicle by the foot of the operator for moving said foot member between a predetermined elevated position and a predetermined depressed position, said foot member having a groove providing a surface to engage a rail and also having floor-engaging surfaces at opposite sides of said groove, said foot member having an upwardly facing socket into which the lower end of said stem extends, and there being a cross pin extending through the side wall of said socket and through the stem.

15. A platform used for assembly operations in industrial plants and mounted for precise guidance in rectilinear movement and for precise positioning when at rest, said platform having a supporting wheel provided with a groove conforming to the summit portion of a guide rail of inverted V-shape in cross section, and said platform also having at its under portion a device operable by the foot of the operator at the side of the platform for engaging the rail summit to lift the platform to an extent such that when the lifting movement is completed the supporting wheel remains in light contact with the rail, said device being in close proximity to said wheel and in following relation to said wheel, said device comprising a shoe with a V-shaped groove on its under surface, and means for maintaining said last-named groove in substantial alignment with the guide rail.

16. A platform used in assembly operations in industrial plants and mounted for precise guidance in rectilinear movement and for precise positioning when at rest, said platform having corners and supporting wheels at the corners each provided with a groove conforming to the summit portion of a guide rail of inverted V-shape in cross-section, said platform also having at its under portion at at least one side a shoe in close proximity and following relation to one of the wheels at that side, said shoe having a V-shaped groove held in alignment with the rail and the shoe being operable for engaging the grooved portion with the rail summit to lift the platform to an extent such that the platform load is supported with the supporting wheels remaining in light contact with the rails.

17. An industrial truck having a supporting wheel provided with a V-shaped groove, said truck also carrying underneath its body a depressible anchoring shoe having on its lower surface a V-shaped groove alined with the groove of the wheel, and operating mechanism for said shoe whereby it is shifted between a predetermined elevated position and a predetermined depressed position and subjected to downwardly acting spring pressure in the depressed position.

18. An industrial truck having supporting wheels running on rails, said wheels each having a circumferential groove whereby it engages the underlying rail and said rail having an upwardly projecting portion entered in the groove and limiting the movement of the wheel laterally in both directions, said truck carrying in close following relation to one of said wheels an anchoring shoe having at its under portion a longitudinal cam groove in alinement with said wheel groove and cooperating with the rail to provide precise positioning of the truck when in engagement with said rail, and operating mechanism for said shoe operable by the foot of the operator and arranged to shift said shoe between a predetermined elevated position and a predetermined depressed position, said mechanism including a spring which in the depressed position of the shoe lifts the truck and the said wheel but only to such extent that the supporting wheel remains in light but positioning contact with the rail and the upwardly projecting portion of the rail will continue to limit the lateral movement of the wheel in both directions.

WALTER F. HEROLD.